United States Patent [19]

Wright

[11] Patent Number: 5,633,931
[45] Date of Patent: May 27, 1997

[54] METHOD AND APPARATUS FOR CALCULATING MESSAGE SIGNATURES IN ADVANCE

[75] Inventor: Jimmy J. Wright, West Jordan, Utah

[73] Assignee: Novell, Inc., Orem, Utah

[21] Appl. No.: 497,311

[22] Filed: Jun. 30, 1995

[51] Int. Cl.$^6$ ........................................ H04L 9/30
[52] U.S. Cl. ............................... 380/25; 380/30
[58] Field of Search ..................... 380/25, 29, 30; 342/13–15

[56] References Cited

U.S. PATENT DOCUMENTS

| | | | |
|---|---|---|---|
| 4,393,269 | 7/1983 | Konheim et al. | 380/25 |
| 4,881,264 | 11/1989 | Merkle | 380/25 |
| 4,947,430 | 8/1990 | Chaum | 380/25 |
| 5,231,668 | 7/1993 | Kravitz | 380/30 |
| 5,349,642 | 9/1994 | Kingdon | 380/25 |
| 5,371,794 | 12/1994 | Diffie et al. | 380/30 |
| 5,442,645 | 8/1995 | Ugon et al. | 380/29 |
| 5,475,763 | 12/1995 | Kaufman et al. | 380/30 |

OTHER PUBLICATIONS

RFC 1320, "The MD4 Message-Digest Algorithm", R. Rivest, MIT Laboratory for Computer Science and RSA Data Security, Inc., Apr., 1992.

*Primary Examiner*—Salvatore Cangialosi
*Attorney, Agent, or Firm*—Dinsmore & Shohl LLP

[57] ABSTRACT

The present invention provides an improved method and apparatus for authenticating message packets to prevent forgery thereof. A server processes a client request and generates a response message. A message signature, which is generated using the session key and the message itself, is appended to the message to create an appended message. The server sends the appended message to the client. At the same time that the server works on the client request, the client predicts the response message and calculates a predicted message signature based on the session key and the predicted message. After receiving the appended message, the client strips the message signature from the appended message and compares it to the predicted message signature. If the two signatures match, the received message packet is authenticated.

23 Claims, 7 Drawing Sheets

MESSAGE PACKET

METHOD AND APPARATUS FOR CALCULATING MESSAGE SIGNATURES IN ADVANCE

TECHNICAL FIELD

The invention relates generally to network communications and more particularly to authenticating message signatures.

BACKGROUND OF THE INVENTION

Through a computer network, multiple computers may be linked together to allow the computers to communicate with each other and to share data, applications, files, and other resources such as printers and modems. A typical computer network can be analogized to a wheel having a hub and spokes. Generally, the hub comprises a centralized computer called a "server" to administer communications and to manage centralized resources and data. The services of the server are shared and accessed by other computers, usually referred to as "clients," which constitute the spokes. Such an arrangement is referred to as a client/server computer network.

Clients and the server typically interface by sending messages (e.g. requests and responses) in the form of message packets. A message packet contains a series of information in a format recognized within the network. For example, a message packet can contain the following series of information: a packet header that identifies the length of the message and provides other network specific information, a request code that designates the particular type of procedure being requested, and data that provides relevant information for the message.

Sometimes an intruder can forge message packets and gain unauthorized access within the network. Unauthorized access can take a variety of forms. For example, an unauthorized user having no access to the network could gain unauthorized access. Alternatively, a user having limited network access could access to restricted information in the network. Whatever the form of unauthorized access, an intruder could conceivably retrieve sensitive or secret data within the network. In addition, an intruder could intentionally or inadvertently modify, delete, or otherwise sabotage critical data or functions within the network.

One system for protecting sensitive information within a network is disclosed in U.S. Pat. No. 4,349,642 to Kingdon. In general terms, the systems disclosed in Kingdon authenticates message packets in a client/server network as follows:

1. When the client initiates a session by logging on to the network, both the client and the server store a code called a "session key" that is unique to the client and the session.

2. As the client communicates on network, the client sends a message to the server, known as a request. Appended to the request is a message signature derived from the session key and the request itself. Therefore, the message signature is unique to the client, the session, and the request.

3. Upon receiving the appended request, the server strips the message signature and calculates its own message signature using the request and the session key. If the calculated message signature and the received message signature match, the server processes the request.

4. After the request has been processed, the server prepares a response message. Appended to the response is another message signature generated from the response and the session key.

5. Upon receiving the appended response, the client strips the message signature and calculates its own message signature using the response and the session key. If the calculated signature and the response signature match, the message transaction has been successfully completed and the client can begin a new transaction with the server.

While the system disclosed in Kingdon effectively prevents message packet forgery, it can be time consuming. Each of the steps and calculations add overhead and introduce delays in the transferring of messages. Individually, such signature authentication means may result in a relatively small delay. However, the cumulative effect of delaying potentially thousands or millions of messages transferred within a computer network can result in a significant and problematic cumulative delay.

SUMMARY OF THE INVENTION

Accordingly, an object of this invention is to provide an improved means for preventing message packet forgery.

Another object of this invention is to provide an improved message packet authentication means for preventing message packet forgery.

Yet another object of this invention is to provide an improved message packet authentication means for preventing message packet forgery that reduces message authentication time.

A further object of this invention is to provide an improved message packet authentication means for preventing message packet forgery that reduces overall message transaction time.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

To achieve the foregoing and other objects of this invention, a method and apparatus are provided for authenticating a message transmitted from a sender to a receiver, where the message is a response to a prior communication from the receiver to the sender, comprising the following steps. First, the sender generates a message signature at least partially derived from a message and a code held by both the sender and receiver. Second, the sender creates an appended message by combining the message signature to the message. Third, the sender sends the appended message to the receiver. Fourth, prior to receiving the message signature and message from the sender, the receiver generates a predicted message signature that is at least partially derived from an expected message from the sender to the receiver and a code held by both the sender and receiver. Fifth, the receiver receives the appended message transmitted by the sender. Sixth, the receiver compares the predicted message signature with the received message signature. Lastly, the receiver authenticates the message it received if the predicted message signature and the received message signature match.

Still other objects and aspects of the present invention will become apparent to those skilled in the art from the following description of a preferred embodiment, which is simply by way of illustration one of the best modes contemplated for carrying our the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with the description serve to explain the principles of the invention. In the drawings.

DETAILED DESCRIPTION OF THE INVENTION

Reference will now be made in detail to the present preferred embodiment of the invention, an example of which is illustrated in the accompanying drawings, wherein like numerals indicate the same elements throughout the views.

The preferred embodiment of the present invention is disclosed in reference to the message authentication disclosed in the aforementioned U.S. Pat. No. 5,034,642 in Kingdon. As understanding the prior art system disclosed in the Kingdon disclosure is helpful to understanding the preferred embodiment, the prior art system will be described first, followed by a detailed description of the preferred embodiment of the present invention. It will be appreciated, however, that the portions of the system as discussed below are for illustrative purposes only, and that the present invention may be used in conjunction will any number of other message authentications systems.

The Kingdon Authentication System

Figure 1:
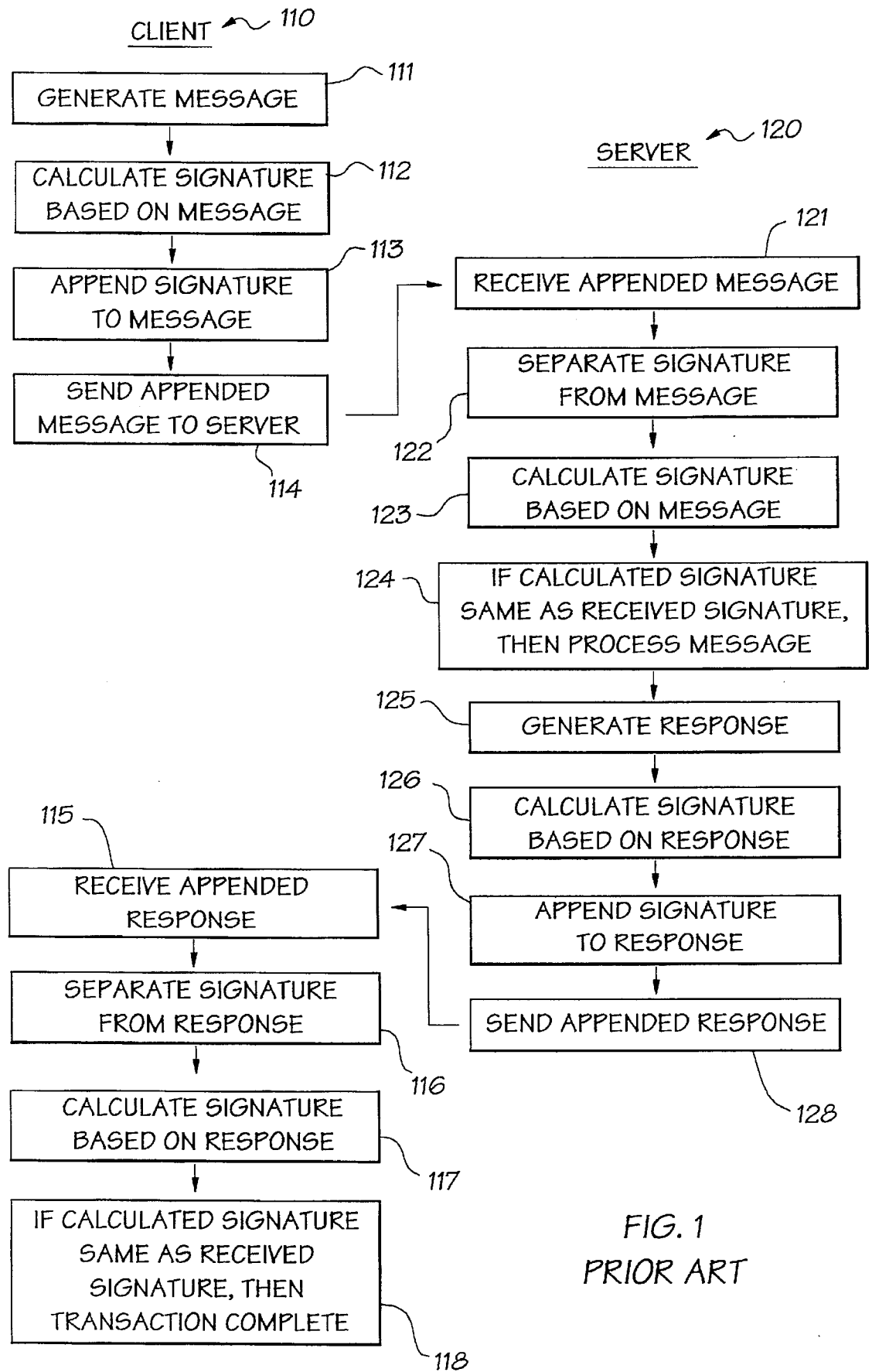
FIG. 1 shows a sequential flow chart of a prior art system for authenticating messages as applied in a client/server computer network.

FIG. 1 shows a sequential flow chart of the prior art message authentication disclosed in the aforementioned Kingdon disclosure. The left-hand column represents actions taken by the client 110, and the right-hand column represents actions taken by the server 120. At step 111, the client generates a message such as a request to open a file. In step 112, the client calculates a signature (discussed below) from the message and the session key (discussed below). Next, the client appends the signature to the message and sends the appended message to the server, as shown in steps 113 and 114, respectively.

After receiving the appended message 121, the server separates the signature from the message 122. In step 123, the server calculates a signature based on the received message and the session key. Next, at step 124 the server compares the calculated signature with the received signature. If the two signatures match, the server process the message. If the two signature do not match, the server disregards the message, generates an alert, and no further action is taken (not shown on flow chart). After the message has been processed, the server generates a response at step 125. Next, the server calculates a signature based on the response and the session key 126. In steps 127 and 128, the server appends the signature to the response and sends the appended response to the client.

Once the client receives the appended response in step 115, the client separates the signature from the response 116. At step 117, the client calculates a signature based on the response and the session key. As shown in step 118, if the calculated signature and the received signature match, the received signature has been authenticated. As such, the message transaction has been successfully completed and the client can begin a new transaction with the server.

Generating a Session Key

Hereinafter, as used in the present specification and claims, the term "session key" will be used to refer to a code unique to a client, a session, or both. "Session" refers to a period or term upon which the client is connected to the network and authorized to transact thereto. For example, the session can be the period between logging on and logging off the network.

Figure 3:
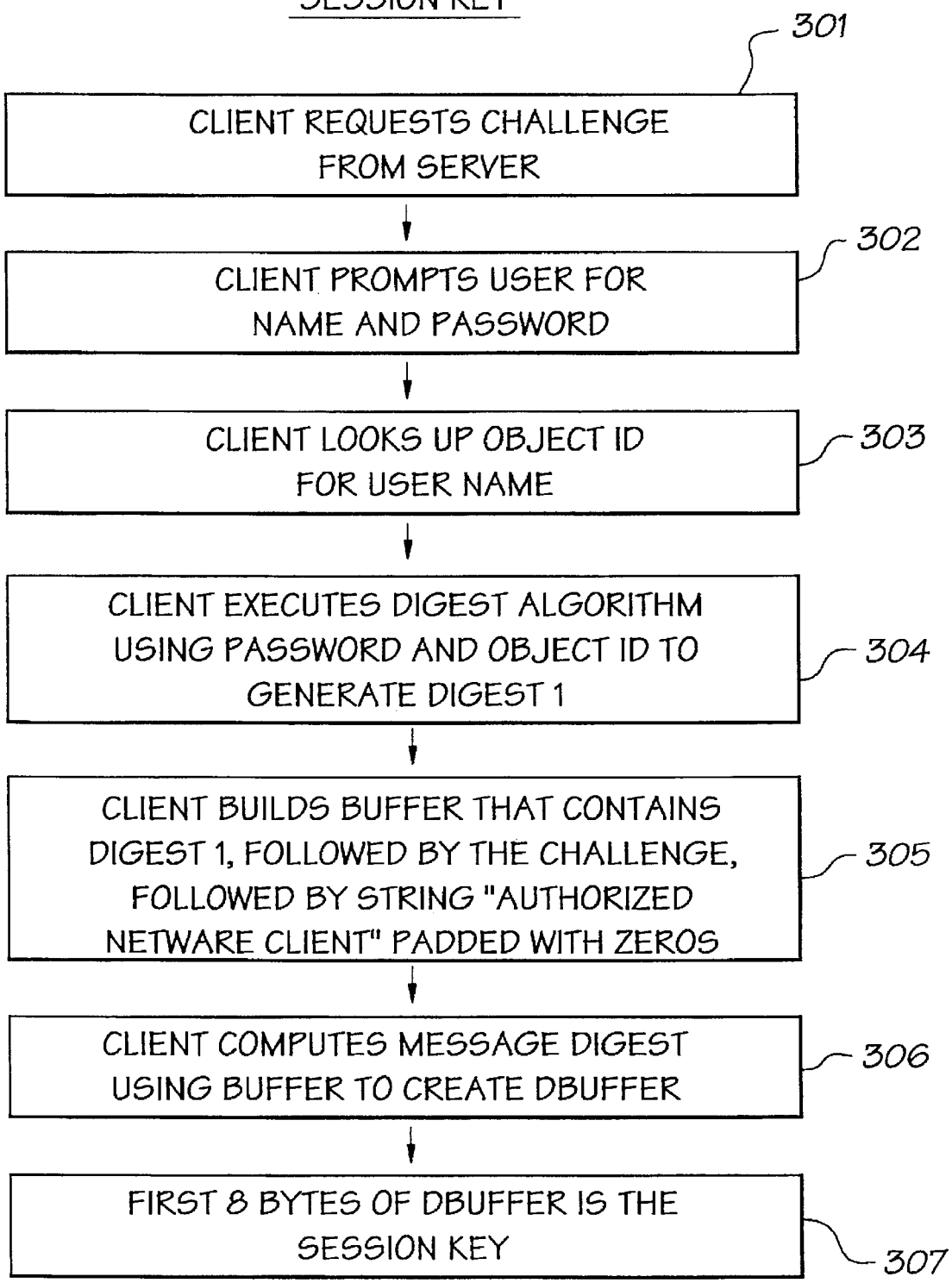
FIG. 3 shows a sequential flow chart of a process to create a session key as applied in a client/server computer network.

A method for generating a session key is illustrated in FIG. 3. To initiate a session, the user (typically a human) attempts to log on to the client server. At step 301, the client requests and receives a challenge from the server machine. The challenge consists of 8 bytes of random numbers. In step 302, the client prompts the user for an account name and a password. When the user enters an account name and password, the client machine determines an object ID associated with the account at step 303. The object ID is a numeric surrogate key or index that is associated with each account.

At step 304, the client machine uses the password and the object ID to compute a digest from a digest algorithm to generate a 16 byte result referred to as Digest1. In step 305, the client builds a second buffer comprising digest1, the challenge, and optionally a text string. In the preferred embodiment, the text string of the present invention is "Authorized NetWare Client." The second buffer is padded with zeros if necessary to provide 64 bytes. The padding is added because the preferred embodiment of the digest algorithm used in step 306 requires 64 bytes for its operation.

In step 306, the client machine performs a digest on the second buffer (Digest1, the challenge, 0's padding, and optionally the text string) to generate a digest called Dbuffer. At step 307, the first eight bytes of Dbuffer are stripped and defined as the session key. Although the preferred embodiment uses 8-bytes as the session key, any number of bytes or bits may be used without departing from the scope of the invention.

The server also has stored the password, account name, object ID, and challenge. Using the same steps, the server machine generates the session key. Thus, the session key is never transmitted over the wire. It is generated from secure information at the client machine and the server machine. In addition, because the session key depends in part on the challenge (a random number) the session key is different for each client/server session.

The preceding description of the preferred embodiment employs the use of a digest algorithm. However, other cryptographically secure one way hashing algorithms may be used instead of a digest algorithm without departing from the scope and spirit of the present invention. A hash function is a mathematical function that maps values from a large domain into a smaller range. In the preferred embodiment, the resulting range from the function will be evenly distributed and apparently random.

Although not shown in FIG. 3, a response can be generated to the challenge after step 304. The response, which is sent to the server, can be generated by a hashing algorithm that is different from the hashing algorithm that is used in steps 305 and 306. For example, if step 304 is accomplished using the MD4 algorithm, then the challenge response can use the MD5 algorithm and the session key can be generated using the MD4 algorithm. Alternatively, the challenge response can be generated using the MD4 algorithm and the session key can be generated using a different algorithm, such as the MD5 algorithm. Any different digesting or hashing schemes can be used as long as there is no mapping of the output of the other algorithm.

Calculating a Message Signature

Figure 4:
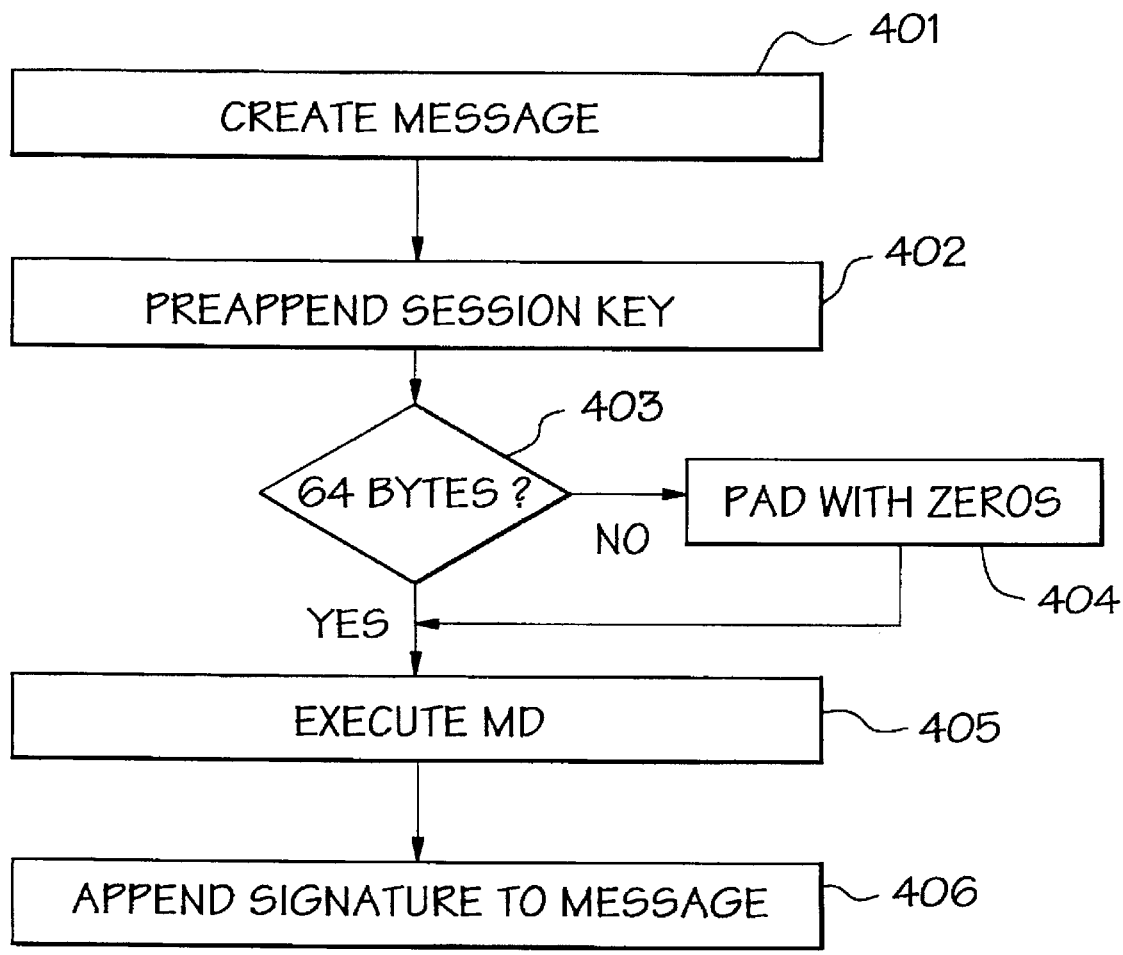
FIG. 4 shows a sequential flow chart of a process to calculate a message signature as applied in a client/server computer network.
Figure 5A:
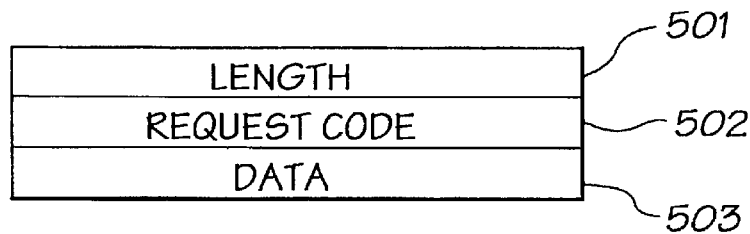
FIG. 5A through 5D show diagrams of message structures used during a message session.

Hereinafter, as used in the present specification and claims, the term "message signature" or "signature" will be used to refer to a code unique to a message and a session key. A method for creating a message signature is illustrated in the flow diagram of FIG. 4. This method may be used by either the client or the server. At step 401, a message is created. This message is shown in FIG. 5A. The message consists of a 4-byte packet header (low high) indicator 501. The packet header 501 identifies the length of the message that follows and includes source and destination information. The packet header 501 is followed by a request code 502. The request code 502 is the particular type of procedure being requested. The request code 502 is followed by data 503. The data 503 may be of variable length.

Figure 5B:
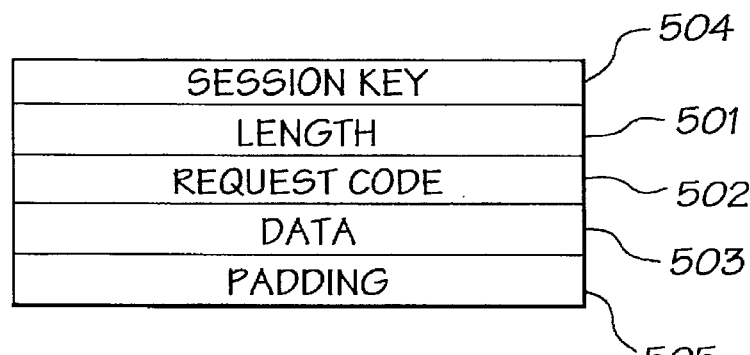

At step 402 the session key is preappended to the message. The prepending of the session key of step 402 is illustrated in FIG. 5B. An 8-byte session key 504 is preappended to the message before the length indicated 501. At decision block 403, if the preappended message does not have 64-bytes the system proceeds to step 404 where the remainder of the message is filled with a padding zeros 505.

Figure 5C:
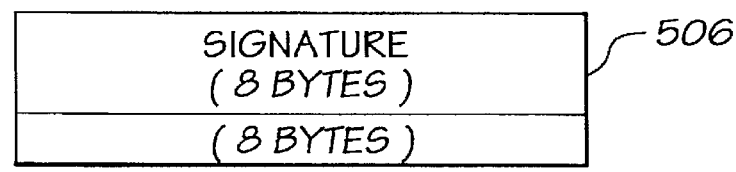
Figure 5D:
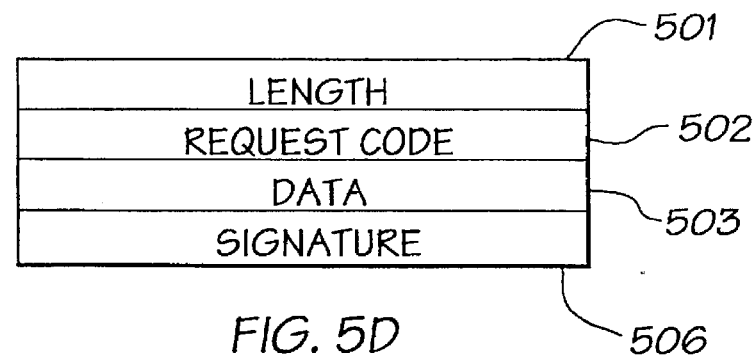

After step 404, or if the argument at decision block 403 is true, the system proceeds to step 405. At step 405, the message digest algorithm is executed to generate a message digest from the preappended message to create the 16-byte message digest represented in FIG. 5C. In step 406, the first eight bytes of the digest defines an 8-byte signature 506. The signature 506 is appended to the message to create an appended message shown in FIG. 5D. The appended message includes the packet header 501, request code 502, data 503, and signature 506.

For example, one kind of message packet is a NetWare Core Protocol ("NCP") packet. An NCP request packet (sent by client) includes the following information:

| UNIT16 | packetType; | // offset 0 |
|---|---|---|
| UNIT8 | sequence Number; | // offset 2 |
| UNIT8 | lowConnectionNumber; | // offset 3 |
| UNIT8 | taskNumber; | // offset 4 |
| UNIT8 | highConnectionNumber; | // offset 5 |
| UNIT8 | ncpMessageVerb; | // offset 6 |
|  | NCP message specific | // offset 7 |

An NGP response (sent by server) includes the following information

| UNIT16 | packetType; | // offset 0 |
|---|---|---|
| UNIT8 | sequence Number; | // offset 2 |
| UNIT8 | lowConnectionNumber; | // offset 3 |
| UNIT8 | taskNumber; | // offset 4 |
| UNIT8 | highConnectionNumber; | // offset 5 |
| UNIT8 | completionCode; | // offset 6 |
| UNIT8 | connectionStatus; | // offset 7 |
|  | NCP message specific | // offset 8 |

The generation of a message signature from an NCP request packet begins with the NCP message verb at offset 6 (offsets 0 through 5 are part of the packet header). If 64 bytes do not exist, then a buffer of zeros will be added until 64 bytes of data are available. From this data, an 8-byte message signature is generated using a digest algorithm. Similarly, the generation of a message signature from the NCP response packet begins with the NCP completion code (offset 6). If 64 bytes do not exist, then a buffer of zeros are added. From this data, an 8-byte message signature is generated using a digest algorithm.

Predicting the Response

Figure 2:
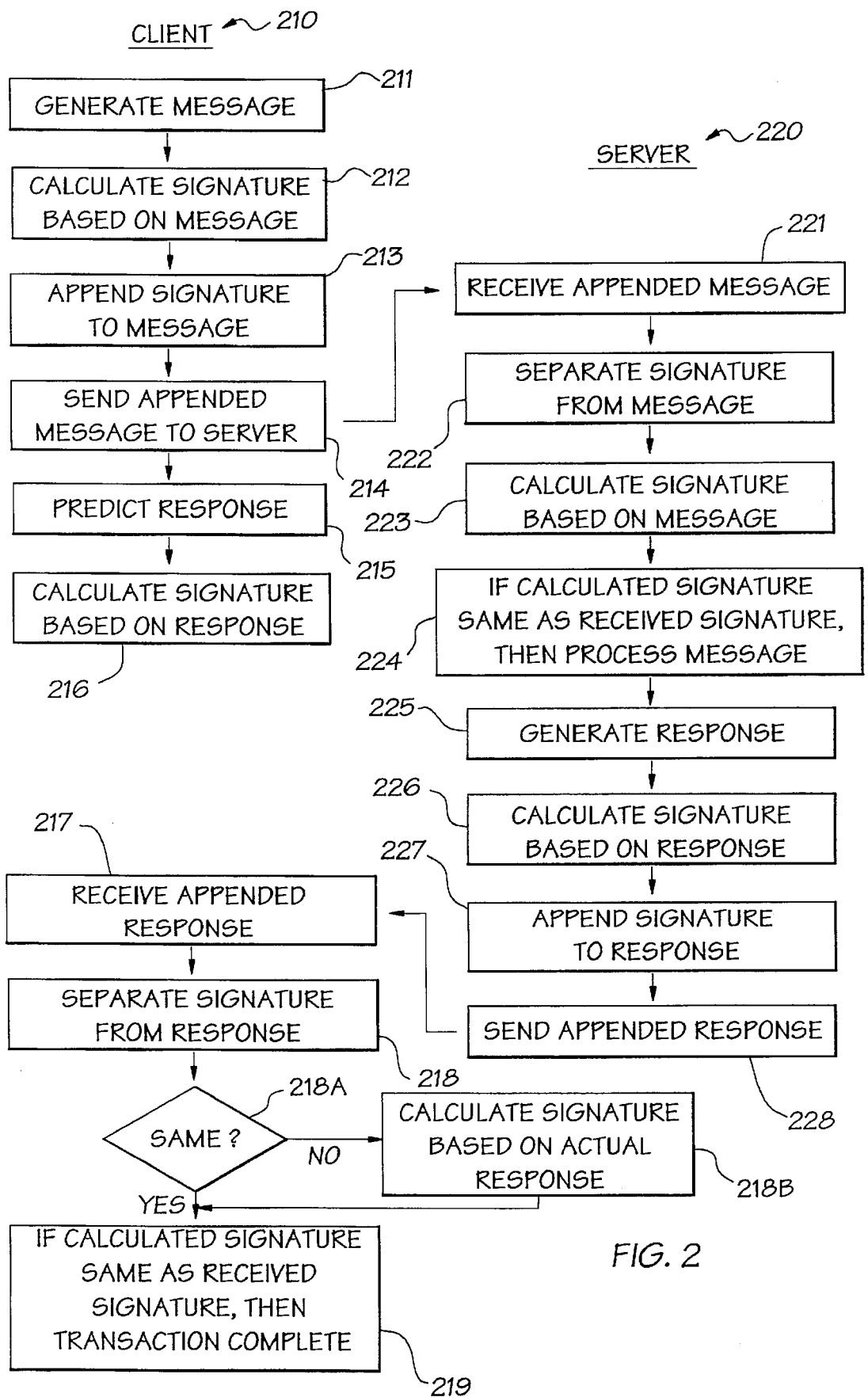
FIG. 2 shows a sequential flow chart of a message authentication method and apparatus as applied in a client/server computer network using the present disclosure.

FIG. 2 shows a sequential flow chart of a message authentication means using the present invention. The left-hand column represents actions taken by the client 210, and the right-hand column represents actions taken by the server 220. Steps 211 through 214 correspond exactly to steps 111 through 114 of the Kingdon system as shown in FIG. 1. In FIG. 2, the client generates a message at step 211. In step 212, the client calculates a signature derived from the message and the session key. Next, the client appends the signature to the message and then sends the appended message to the server, as shown in steps 213 and 214, respectively.

Similarly, steps 221 through 228 correspond to steps 121 through 128 of the Kingdon disclosure as shown in FIG. 1. In FIG. 2, after receiving the appended message 221, the server separates the signature from the message 222. In step 223, the server calculates a signature based on the received message the session key. Next, at step 224 the server compares the calculated signature with the received signature, and if the two signatures match, the server process the message. If the two signature do not match, the server disregards the message, generates an alert, and no further action is taken (not shown on flow chart). After the message has been processed, the server generates a response at step 225. Next, the server calculates a signature based on the response and the session key 226. In steps 227 and 228, the server appends the signature to the response and sends the appended response to the client.

Often, the server's response to the client's message is simply an acknowledgment of completion if the message was successfully processed. Such a response could include a completion code or connection status. For example, if the server successfully processes an NCP File Write request, the server responds that the Write was successful. A client aware of such responses can make use of this information.

While the server is processing the appended message, the client continues to work. At step 215, the client anticipates that the server will successfully process the request and predicts the corresponding response from the server. The client can predict the response from the server in a variety of ways. For example, a reply that has only an NCP completion code would simply be a 64-byte buffer of zeros. As another example, an algorithm or database can be implemented to predict more complex responses. In step 216, shown in FIG. 2, the client calculates a predicted signature derived from the predicted response and the session key. The client then waits for the server to send the appended message 228. Steps 215 and 216 are completed at the same time that the server processes steps 221 through 228.

Once the client receives the appended response in step 217, the client separates the signature from the response 218. The client needs to verify that the actual response is the same as the predicted response as shown in step 218A. As shown in step 219, if the predicted signature and the received signature match, the received message is authenticated, and the message transaction has been successfully completed. The client can then begin a new transaction with the server. If, however, the actual response calculated in step 218A is not the same as the predicted response, the signature needs to be recalculate as indicated in step 218B.

The present invention advantageously operates significantly faster than the prior art. Unlike the prior art, the client does not wait idle while the server processes the appended message it received from the client. By using this otherwise idle time to predict the response signature prior, the time to complete the request response transaction will be reduced by the time needed to calculate a signature based on the actual response received. In other words, the time saved equals the time to complete step 117 in FIG. 1. Thus, the present invention adds an additional step for the client (i.e. step 215), it significantly reduces the net transaction time because it is completed simultaneous to the server processing the appended message.

State Tracking

In addition to the message signature scheme described above, the present invention also provides a method of message authentication using state information. The nature of the MD4 algorithm is such that it is cumulative, i.e. the message digest function can be executed in stages.

For example, a block of a file of messages can be provided to the message digest algorithm, digested and the next block of file can be read in and the digesting continued. The output state of the execution of the digesting algorithm is used as an input state on the next digesting step. The net effect of executing the message digest algorithm in stages is as if the message digest algorithm were executed on an entire block of information in a single pass. Thus, a cumulative effect can be had by remembering the state at the end of each algorithm execution. The present invention takes advantage of this cumulative effect and state information to provide an additional level of security and authentication while improving performance compared to the prior art.

Both client and server track and store state information. In the present invention, this state information consists of the most recently generated message digest. A provisional message digest, using the current message digest and new message, is generated and stored by the client and server. The provisional message digest is used instead of the session key to generate message signatures. Prior to receiving a new message, a predicted digest is generated using a predicted new message and the provisional state. Upon receiving the new message, the new message digest is compared to the predicted digest. A match is only possible if the other party had the previous state information. The incorrect starting state information will propagate an error that identifies intruders and forged messages.

Figure 6:
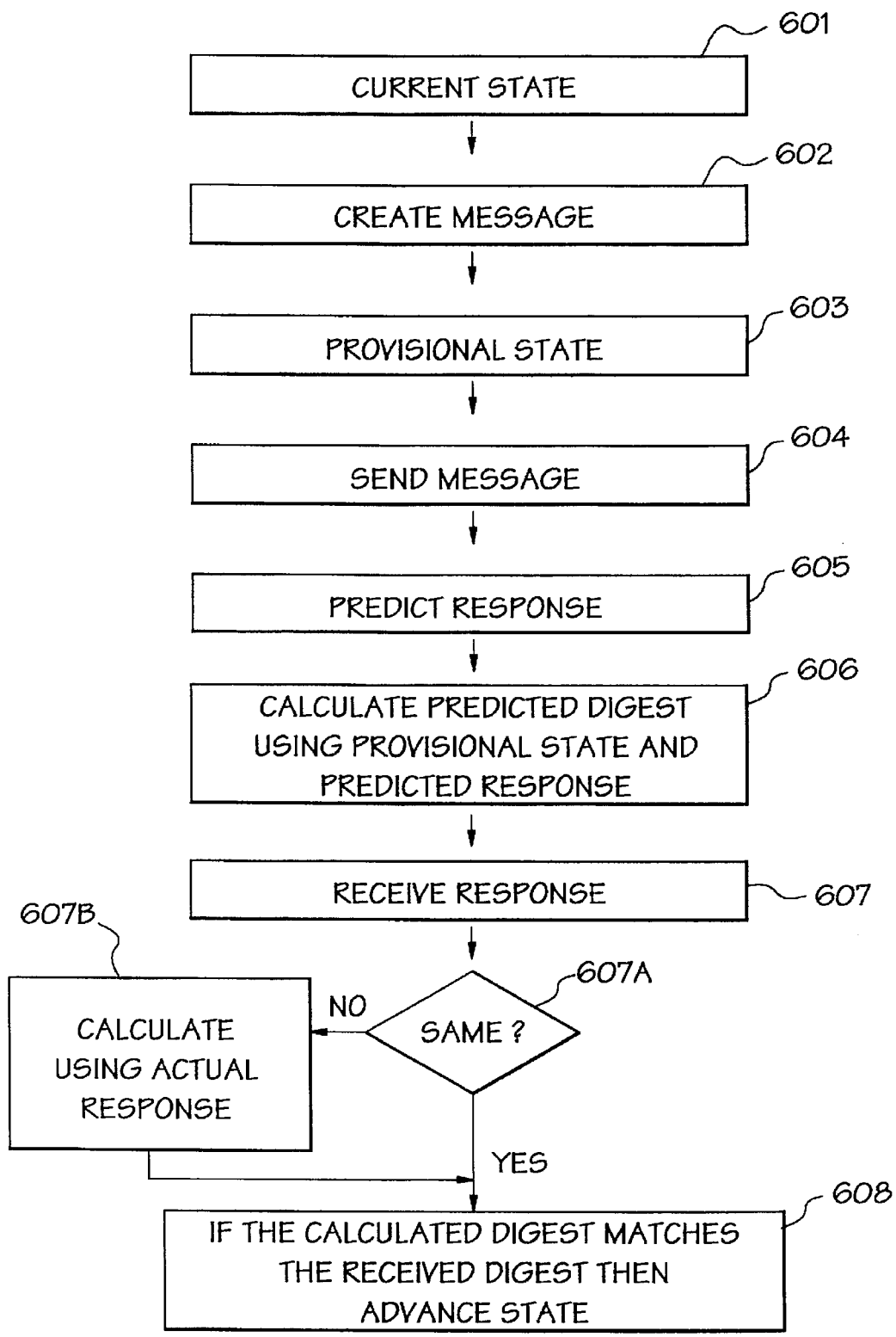
FIG. 6 shows a sequential flow chart of a state tracking process implementing the present invention.

Referring to FIG. 6, a flow diagram of a state tracking process that implements the present invention is illustrated. At step 601, the current state of the client is the full 16 byte message digest generated from a previous valid message. At step 602, the client creates a new message. At step 603, the client applies the message digesting algorithm to the new message, using the current state (digest) as a starting point to create a provisional state.

At step 604, the message is sent to the server. Prior to receiving a response from the server, the client generates a predicted response in step 605. Next, at step 606 the client calculates a predicted digest by applying the message digest algorithm to the message using the provisional state as a starting point.

At step 607, the client receives a response from the server. The predicted response is then compared with the actual response in step 607A. If the responses match, the system checks to see if the calculated digest matches the received digest. If the calculated and recieved digests match, the received message is authenticated indicating that the message transaction has been successfully completed and the state can be advanced as shown in step 608. If the predicted digest does not match, the received digest, the predicted digest is recalculated from the actual response as indicated in 607B. This is accomplished by stripping the server generated digest from the replay and comparing the first eight bytes of the server generated digest to the first eight bytes of the predicted digest. If the digest is not authenticated, the system does not advance the state, since an invalid replay has been received. The next message generated by the client will use the existing current state at the starting point for the digesting algorithm. If the two digits match, the system advances the state, that is, it makes the provisional state the current state. That new current state will now be the starting point when applying the digesting algorithm to the next message.

Burst Messages

In some cases, the client may send a burst of data to the server, or a client request may generate a burst reply. The order of the messages in the packet burst (except for the first packet) is not necessarily fixed. This can create problems in calculating state information, because of the cumulative nature of the digesting algorithm. For packet burst replies, the server calculates the message digest for the first reply packet and uses the same state to calculate message digests for all remaining packets in the burst. In this manner, regardless of the order of packets after the first packet, state integrity can be maintained.

Burst requirements are handled the same way. The first packet in a stream is factored in the state of the digest algorithm. Subsequent packets in the burst request use the same state as the first packet as the initial state.

Figure 7:
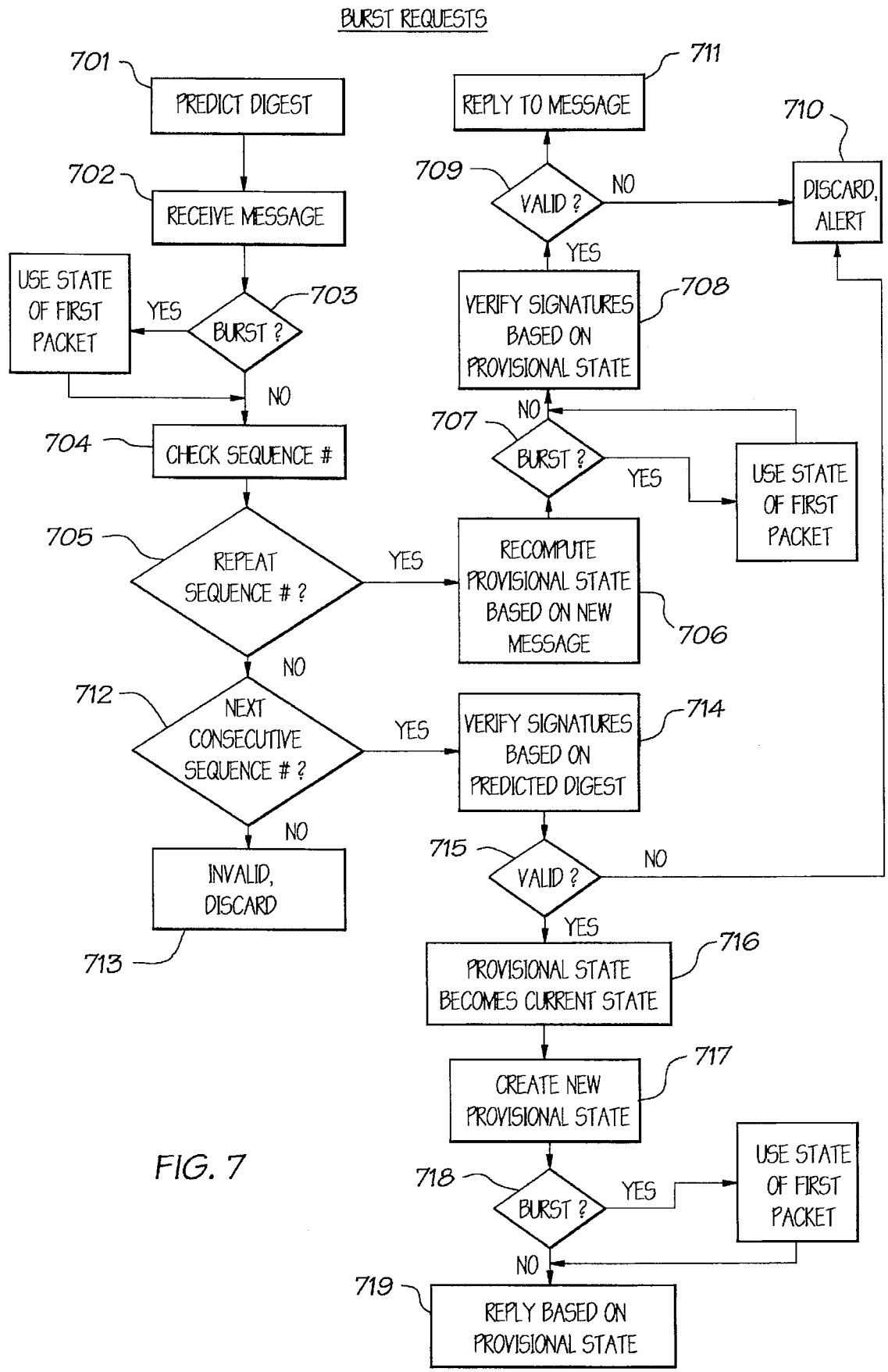
FIG. 7 shows a sequential flow chart of a burst request process implementing the present invention.

A flow diagram illustrating the operation of the server in maintaining state information is illustrated in FIG. 7. Prior to receiving a message, a predicted digest is generated using a predicted message and the provisional state, as shown in step 701. At step 702, the server receives a message from the client. At decision block 703, the argument "burst?" is made. If the argument is true, the system uses the state of the first packet and returns to step 704. If the argument is false, the system proceeds to step 704 and checks the sequence number. At decision block 705, the argument "repeat sequence number?" is made. This is to identify repeat requests. The digest output generated for request packets is always factored into the digest state. Thus, the prior digest state must be maintained by the server when repeat requests are encountered. If the argument at decision block 705 is true, the system proceeds to step 706 and recomputes a provision state based on the new message, using the stored previous state.

At decision block 707, the argument "burst?" is made. If the argument is true, the system proceeds to step uses the state of the first packet and returns to step 708. If the argument is false, the system proceeds to step 708. At step 708, the signatures of the message are verified based on the provisional state. At decision block 709, the argument "valid?" is made. If the argument is false, the system discards the message and provides an alert for a potential forged message at step 710. If the argument at decision block 709 is true, the system replies to message at step 711.

If the argument at decision block 705 is false, the system proceeds to decision block 712. At decision block 712, the argument "next consecutive sequence number?" is made. If the argument is false, the system proceeds to step 713, declares the message invalid and discards it. In other words, the sequence number was inappropriate. If the argument at decision block 712 is true, the system proceeds to step 714 and verifies the signatures based on the predicted digest.

At decision block 715, the argument "valid?" is made. If the argument is false, the system proceeds to step 710, the message is discarded, and an alert is generated. If the argument is true, the system proceeds to step 716. At step 716, the provisional state is redefined as the current state. At step 717, a new provisional state is created based on the reply. At decision block 718, the argument "burst?" is made. If the argument is true, the system uses the state of the first packet and proceeds to step 719. If the argument is false, the system proceeds to step 719 and replies to the client based on the provisional state that has been calculated.

The foregoing description of a preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

I claim:

1. A method for authenticating a message transmitted from a sender to a receiver, comprising the steps of:
   a) generating at the sender a message signature;
   b) sending from the sender to the receiver the message signature and a message;
   c) generating at the receiver, prior to receiving the message signature and message from the sender, a predicted message signature that is likely to be transmitted from the sender to the receiver;
   d) receiving at the receiver the message signature and message transmitted by the sender;
   e) comparing at the receiver the predicted message signature with the received message signature; and
   f) authenticating the message received by the receiver if the predicted message signature and the received message signature match.

2. A method as recited in claim 1, wherein the sender and receiver are digital computers.

3. A method as recited in claim 2, wherein the sender and receiver are a server and client, respectively, in a computer network.

4. A method as recited in claim 1, wherein the message is a response to a prior communication from the receiver to the sender.

5. A method as recited in claim 3, wherein the message is a completion code or connection status.

6. A method as recited in claim 1, wherein the message signature generated by the sender is at least partially derived from the message.

7. A method as recited in claim 1, wherein the message signature generated by the receiver is at least partially derived from an expected message.

8. A method as recited in claim 1, wherein the message signature generated by the sender and the message signature generated by the receiver are at least partially derived from a code held by both the sender and receiver.

9. A method as recited in claim 7, wherein the code is the session key.

10. A method as recited in claim 1, wherein the message signatures generated by the sender and the receiver are derived from a digest algorithm.

11. A method as recited in claim 1, wherein in step b) the sender appends the message signature to the message to form an appended message which is sent from the sender to the receiver.

12. A method for authenticating a message transmitted from a sender to a receiver, comprising the steps of:
   a) generating at the sender a message signature at least partially derived from a message and a code held by both the sender and receiver;
   b) sending from the sender to the receiver the message signature and a message;
   c) generating at the receiver, prior to receiving the message signature and message from the sender, a predicted message signature that is at least partially derived from an expected message from the sender to the receiver and a code held by both the sender and receiver;
   d) receiving at the receiver the message signature and message transmitted by the sender;
   e) comparing at the receiver the predicted message signature with the received message signature; and
   f) authenticating the message received by the receiver if the predicted message signature and the received message signature match.

13. A method as recited in claim 12, wherein the sender and receiver are digital computers.

14. A method as recited in claim 13, wherein the sender and receiver are a server and client, respectively, in a computer network.

15. A method as recited in claim 12, wherein the message is a response to a prior communication from the receiver to the sender.

16. A method as recited in claim 12, wherein the message is a completion code or connection status.

17. A method as recited in claim 12, wherein the code held by both the sender and receiver is the session key.

18. A method as recited in claim 12, wherein the message signature generated by the sender and the predicted message signature generated by the receiver are derived from a digest algorithm.

19. A method as recited in claim 12, wherein in step b) the sender appends the message signature to the message to form an appended message which is sent from the sender to the receiver.

20. A method for authenticating a message transmitted from a sender to a receiver, where the message is a response to a prior communication from the receiver to the sender, comprising the steps of:

a) generating at the sender a message signature at least partially derived from a message and a code held by both the sender and receiver;

b) creating at the sender an appended message by combining the message signature to the message;

c) sending from the sender to the receiver the appended message;

d) generating at the receiver, prior to receiving the message signature and message from the sender, a predicted message signature that is at least partially derived from an expected message from the sender to the receiver and a code held by both the sender and receiver;

e) receiving at the receiver the appended message transmitted by the sender;

f) comparing at the receiver the predicted message signature with the received message signature; and g) authenticating the message received by the receiver if the predicted message signature and the received message signature match.

21. A method as recited in claim 20, wherein the sender and receiver are digital computers.

22. A method as recited in claim 21, wherein the sender and receiver are a server and client, respectively, in a computer network.

23. A method as recited in claim 20, wherein the code held by both the sender and receiver is the session key.

* * * * *